United States Patent [19]

Anglin

[11] Patent Number: 5,030,943

[45] Date of Patent: Jul. 9, 1991

[54] PORTABLE ELECTROLUMINESCENT BACK LIGHT

[75] Inventor: Noah L. Anglin, San Jose, Calif.

[73] Assignee: Poqet Computer Corp., Santa Clara, Calif.

[21] Appl. No.: 276,167

[22] Filed: Nov. 23, 1988

[51] Int. Cl.⁵ .............................................. G09G 3/30
[52] U.S. Cl. .................................. 340/716; 340/781; 340/784; 350/345
[58] Field of Search ............... 340/716, 760, 781, 765, 340/784; 350/345; 358/236, 239, 241; 362/84, 157; 368/67, 227; 315/169.3; 353/30, 31, 122, DIG. 3

[56] References Cited

U.S. PATENT DOCUMENTS

| | | | |
|---|---|---|---|
| 3,722,206 | 3/1973 | Bergey | 368/67 |
| 4,561,044 | 12/1985 | Ogura et al. | 358/236 |
| 4,562,478 | 12/1985 | Hirasawa et al. | 358/236 |
| 4,652,932 | 3/1987 | Miyajima et al. | 350/345 |
| 4,809,078 | 2/1989 | Yabe et al. | 340/781 |
| 4,846,694 | 7/1989 | Erhardt | 353/DIG. 3 |

Primary Examiner—Jeffery A. Brier
Attorney, Agent, or Firm—Skjerven, Morrill, MacPherson, Frankin & Friel

[57] ABSTRACT

A back light for a liquid crystal display has a self-contained power source and can be attached to the unit having the liquid crystal display when needed in a dark ambient, and removed from the display or not carried by the user of the display when not needed. This portable back light allows the unit with the liquid crystal display to be smaller and lighter in weight than a unit having a built-in back light, and to require a smaller power supply than a unit with a built-in back light. Additionally batteries supplying power to a liquid crystal display unit will last longer. Yet with this portable back light, the user has the convenience of sufficient brightness for viewing the liquid crystal display unit when needed.

8 Claims, 4 Drawing Sheets

U.S. Patent — July 9, 1991 — 5,030,943
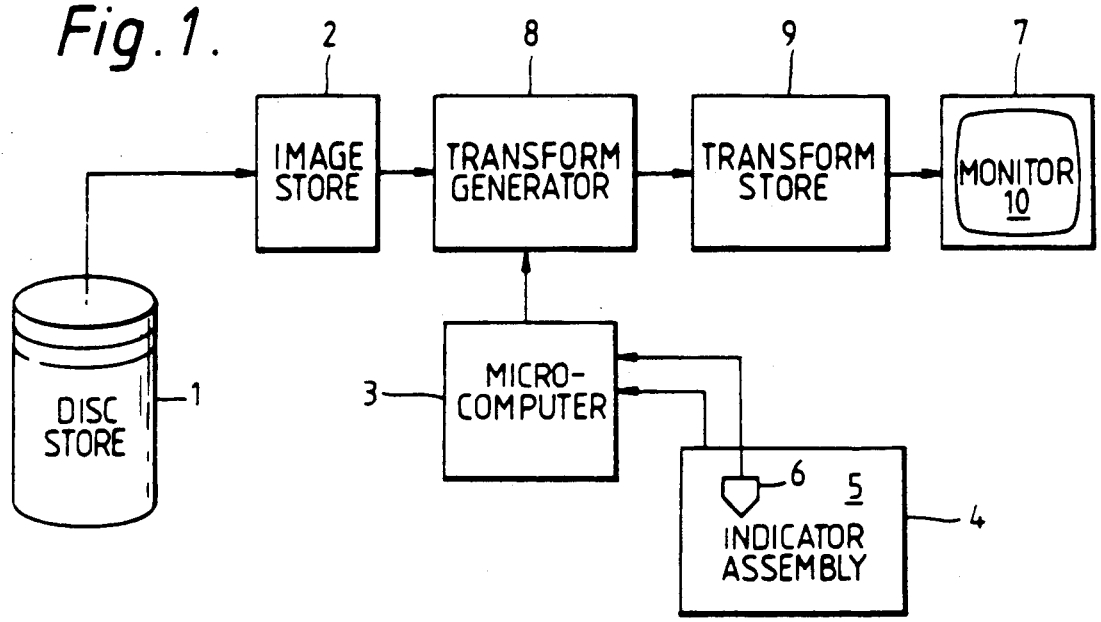
Fig. 1.
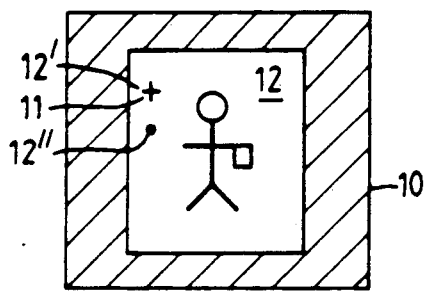
Fig. 2.A
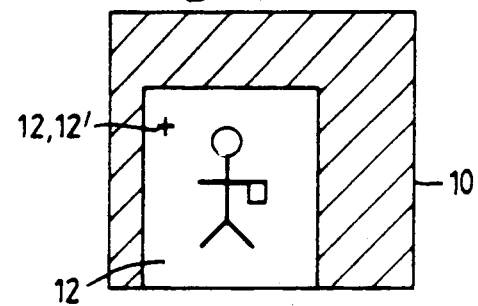
Fig. 2.B
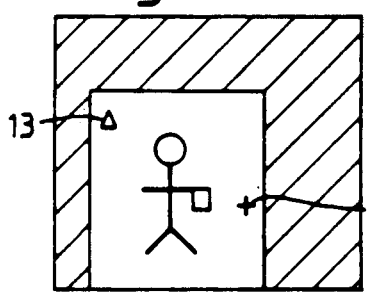
Fig. 2.C
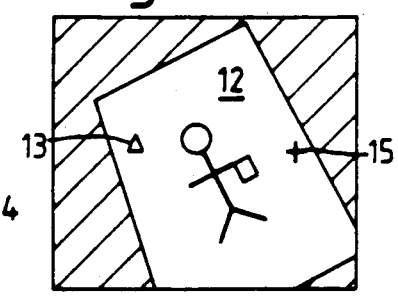
Fig. 2.D
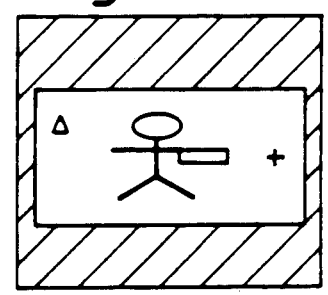
Fig. 2.E
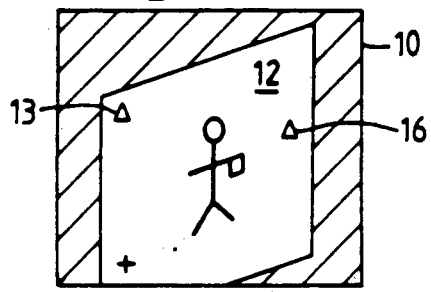
Fig. 2.F
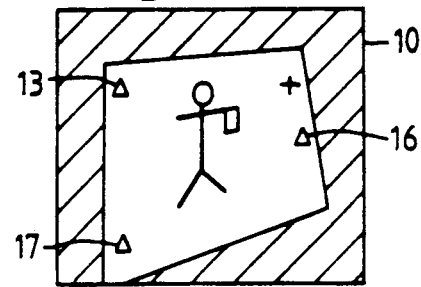
Fig. 2.G

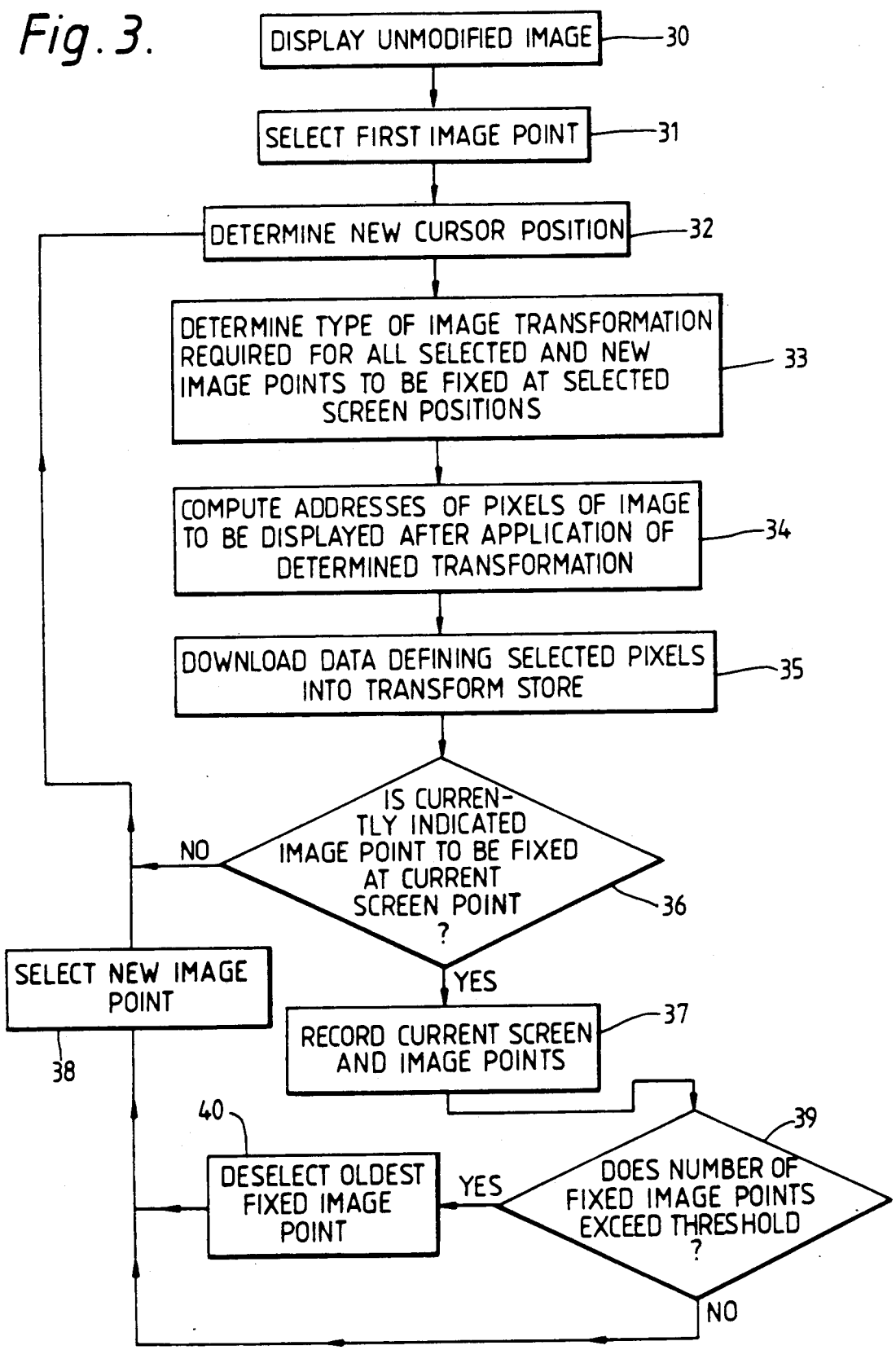

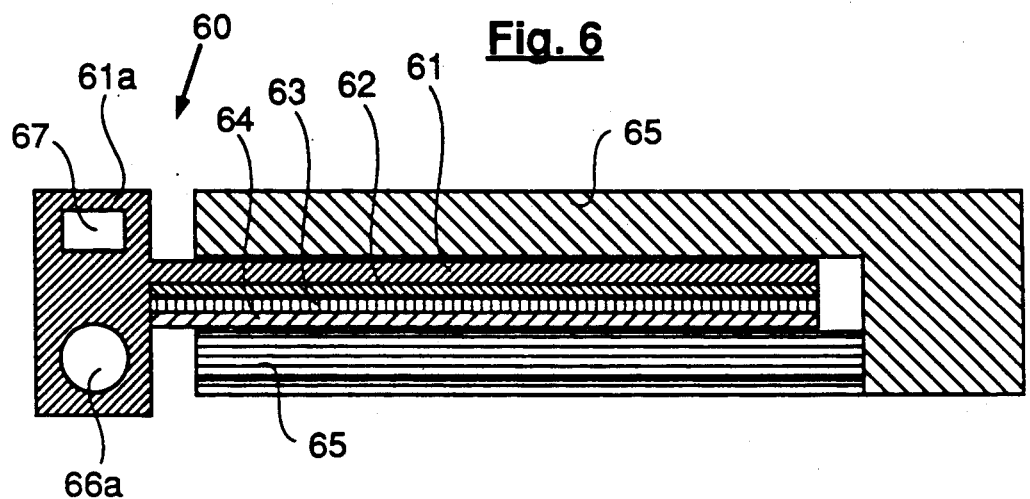
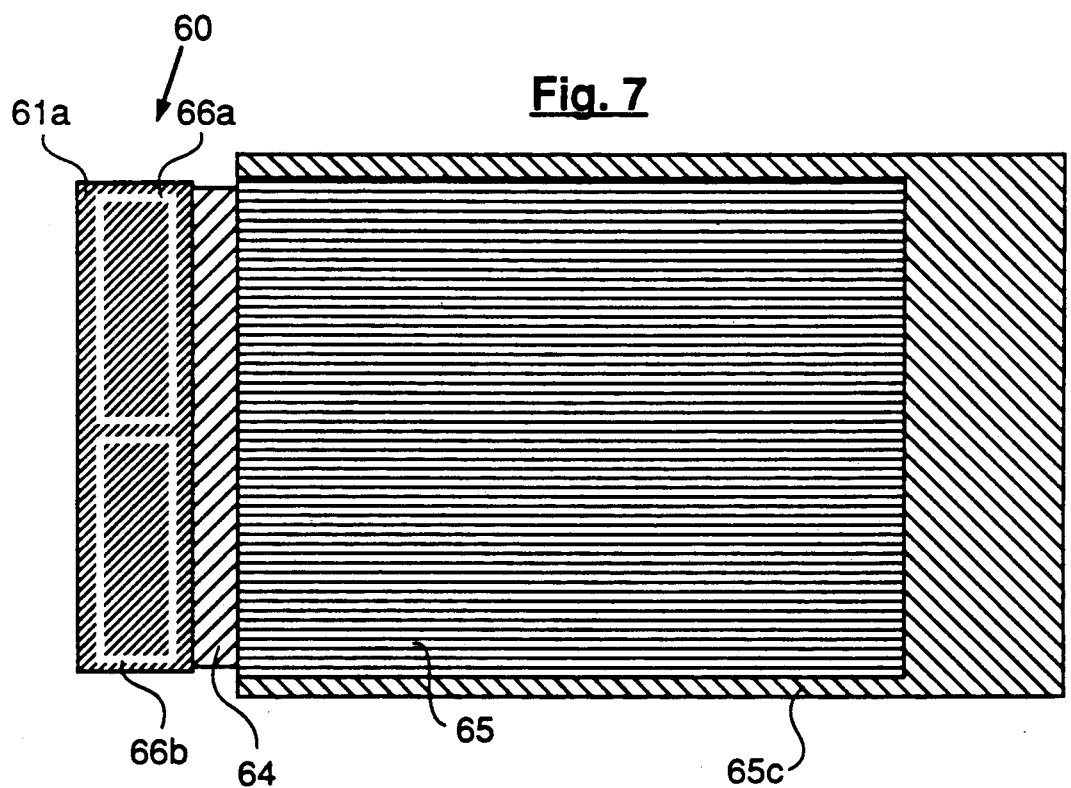

PORTABLE ELECTROLUMINESCENT BACK LIGHT

FIELD OF THE INVENTION

This invention relates to lighting of liquid crystal displays, more particularly to providing a portable back light for a liquid crystal display having a non-opaque back cover.

BACKGROUND

In the field of portable digital displays it is desirable that the electronic devices to which the displays are connected be portable, low in power, capable of being viewed in dark locations or locations of low ambient light, and self contained. Liquid crystal devices have been commonly used for displays because of their low power requirement. However, an external source of light must be used for viewing a liquid crystal display. In a well-lighted room a liquid crystal display can be easily viewed using room light. In order for a liquid crystal display, for example a computer monitor, to also be viewable in a dark ambient, internal back lights have been provided as part of the monitor unit. These internal back lights can be plugged in and/or turned on when needed. The Series 6420 display provided by Alphasil, Inc., of 1045 Mission Court, Fremont, Calif., 94539-9971 includes an internal back light, for example. Electroluminescent panels used in existing displays are thin, on the order of 1.2 mm thick, available in many sizes and shapes and provide uniform light emission over their surfaces. The color and intensity of the emitted light can be changed by adding a filter.

The disadvantage of providing an internal back light as part of the monitor unit is that the size, weight, and expense of the internal back light are present in the monitor unit whether they are needed or not. Further, the power supply for the monitor must include sufficient capacity to power the back light. In some applications it is desirable to have a portable computer or hand held calculator or other device which is as light weight and small in size as possible. Since it may be only occasionally necessary to use a back light with the device, the weight, size, and power requirements of a built-in back light may be undesirable.

SUMMARY OF THE INVENTION

The present invention provides a clip-on, slide-on, or otherwise attachable unit for back lighting a liquid crystal display in which the display portion of the unit is able to transmit external light from a back surface to the viewing portion of the liquid crystal display. This attachable unit allows for a basic device of smaller size and lower weight than one having a built-in back light. Additionally because the attachable unit includes its own power supply, the power supply of the computer or other unit having the liquid crystal display need not provide for the power needs of the back light.

The present invention is useful for lighting displays of portable computers, hand-held calculators, game boards and any other devices which use a liquid crystal display that can be back lighted. The present invention is especially advantageous when these devices to be viewed must be small and when they need to be lighted only part of the time they are used.

Various packaging arrangements can accommodate the portable back light of the present invention. The display may have a removable back cover which is replaced with the back light unit when lighting is needed. Alternatively, a slot may be provided at one edge of the display unit for insertion of a back light unit between the display and its back cover.

BRIEF DESCRIPTION OF THE DRAWINGS

FIG. 1 shows a perspective view of a back light unit of the present invention in combination with a lap-top computer having a display screen to which the unit is being attached.

FIG. 2 shows a cross-sectional view of one embodiment of a back light unit of the current invention in combination with a liquid crystal display screen.

FIG. 3 shows a plan view of the unit of FIG. 2, partly installed.

FIG. 6 shows a cross-sectional view of a third embodiment of a back light unit of the current invention which inserts into a slot along an edge of a corresponding display unit, partly inserted into the unit.

FIG. 7 shows a plan view of FIG. 6.

DETAILED DESCRIPTION

Figure 4:
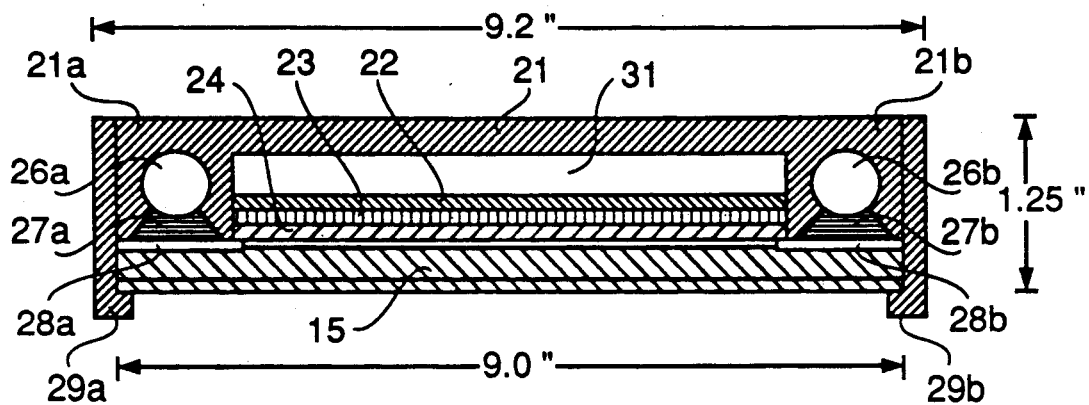
FIG. 4 shows a cross-sectional view of another embodiment of a back light of the current invention in combination with a liquid crystal display.

FIG. 1 shows in perspective view a lap-top computer 18 having a display screen 15 to which a portable back light unit 10 is being attached by sliding over the top edge 15t of screen 15.

As shown in FIGS. 2 and 3, one preferred embodiment of the back light unit 10 of the current invention is sized to clamp to a liquid crystal display screen 15 which measures 9.0 by 4.25 inches. The portable back light unit 10 has a cavity which when mounted, accepts the display screen 15. In the embodiment of FIGS. 2 and 3, batteries 16a, 16b, and 16c are positioned within the unit 10 so that when the unit 10 is mounted to the display screen 15, the batteries 16a, 16b, and 16c are in the plane of the display screen 15, thus allowing the unit 10 to be quite thin. Unit 10 in the embodiment of FIG. 2 is shown having a total depth of 0.75 inches, though other dimensions are possible and depend on such factors as the size of batteries to be used. In addition to the housing 11 having portions 11a and 11b which support batteries 16a, 16b, and 16c the structure includes an electroluminescent panel 13 mounted on a mounting board 12 over which is preferably located a filter 14 for controlling the color and intensity of the light from panel 13. Integral hook members 19a and 19b attached to housing portions 11a and 11b, respectively, hold unit 10 against display screen 15.

An inverter 17 receives power from batteries 16a, 16b, and 16c by wiring means not shown but well known, and generates an alternating current of a frequency and voltage compatible with the electroluminescent panel 13. Other wiring means not shown applies this power to electroluminescent panel 13. Inverter #DAS5V7 provided by Densitron Corporation of 2540 West 237th Street, Torrance, Calif. 90505 receives a 2.5-6.0 volt D.C. signal such as supplied by 3 AA batteries in series. For a 4-volt input signal, this Densitron inverter supplies an output voltage of 83 volts at a frequency of 335 Hz. This output signal is appropriate for powering an electroluminescent panel 13 such as those panels supplied by Alps Electric of 1500 Atlantic Blvd., Auburn Hills, Mich. 48055, which require an operating voltage of 50 to 150 volts AC, an operating frequency of about 200–800 Hz and give a brightness of 40 cd/m$^2$, drawing a current of 0.2 mA/cm$^2$. For a screen 8"×10" this is a current of 0.1 amp at 100 volts, 400 Hz. Battery current at 4 volts is about 2.5 amps. The Alps panels have a thickness of 1.0 to 1.4 mm and can be sized to order. Thus they are appropriate for the present use. Also appropriate for the present use are electroluminescent panels supplied by Bonar Kard-O-Lite, Inc., 421 Feheley Drive, King of Prussia, Pa. 19406.

Use of a flexible plastic material such as Lexan® polycarbonate or Delrin acetate polymer for housing 11 allows enough flexibility that hook members 19a and 19b can be separated sufficiently to allow unit 10 to be clipped onto display screen 15.

Alternatively, back light unit 10 slides onto a top end 15t of display screen 15, as shown in FIG. 1. FIG. 3 shows back light unit 10 partly attached to display screen 15.

Other means of attaching back light 10 to a display screen can be provided, for example magnetic means or swingout hooks.

Figure 5:
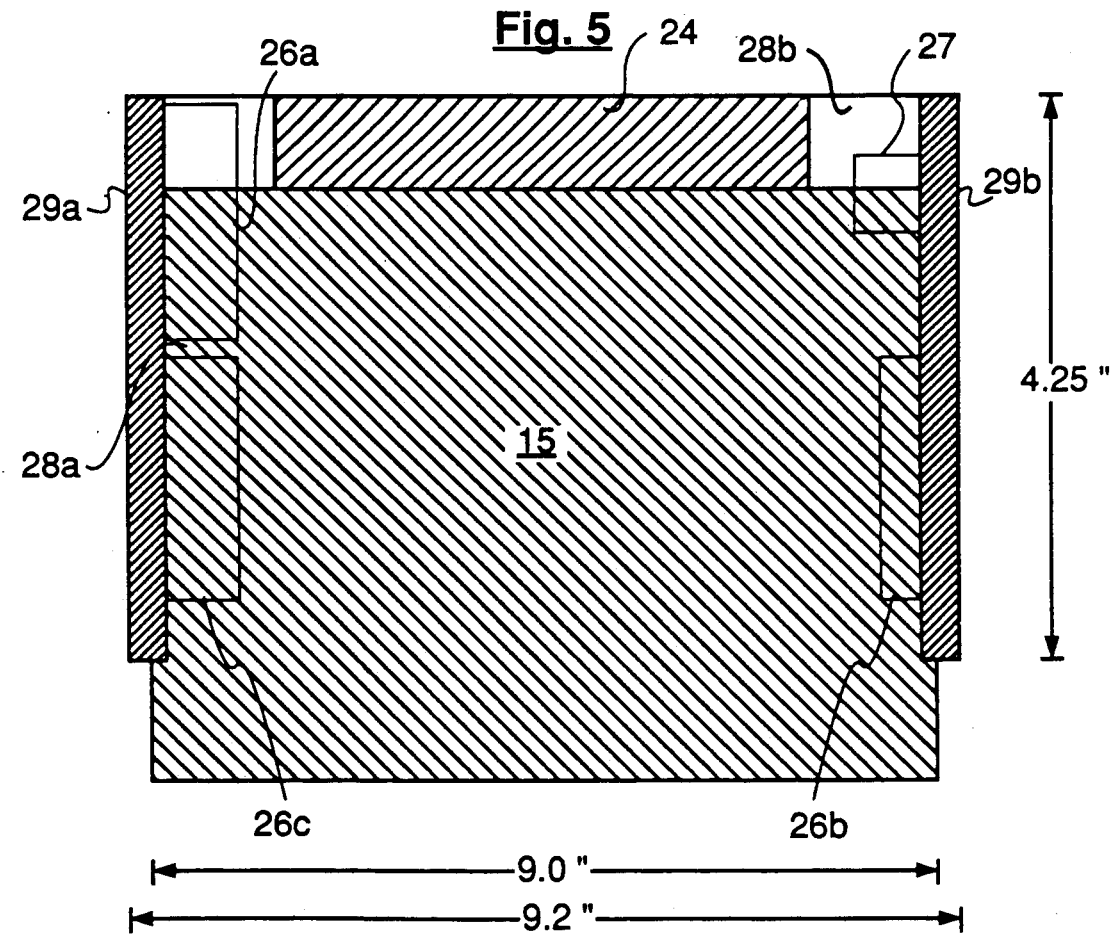
FIG. 5 shows a plan view of the embodiment of FIG. 4, partly installed.

FIGS. 4 and 5 show an alternative embodiment, also battery operated, in which mounting board 22 is supported at its edges by housing 21, in which the position of batteries such as 26a and 26b is behind the plane of display screen 15. Therefore this embodiment is not as wide, but thicker than the embodiment of FIGS. 1-3. As shown in FIG. 4 there is space 31 between mounting board 22 and housing 21. This space can be used for additional components, for example a telephone modem or a disk drive. In this case, appropriate electrical connections between these components and the computer powering the display are also provided in conjunction with the additional components.

As a further alternative, shown in FIGS. 6 and 7, the batteries and inverter are located at one side of the back light unit so that the portion including the electroluminescent panel can be thinner yet, and can be inserted into a slot at one edge of the display unit.

Alternatively, not shown, another embodiment plugs into the wall, using no batteries and can therefore be less thick than the embodiment of FIGS. 4 and 5, less wide than the embodiment of FIGS. 1-3, and not require the battery portion shown in FIGS. 6 and 7. A different inverter converts from the 60 Hz 120 volt signal commonly available to a voltage and frequency appropriate for the electroluminescent panels. A plug-in model has the advantage of not requiring replacement batteries, and the disadvantages of requiring a wall outlet nearby plus a plug and cord unit to accompany the back light unit. In the wall plug model, the inverter is preferably manufactured as part of the wall plug.

The dimensions shown in the illustrated embodiments are meant simply as examples and not to limit the scope of the invention. The dimensions of the back light preferably correspond to the dimensions of the screen to be lighted.

The back light may include a switch at an accessible location for turning on the light or alternatively a switch activated by installing the back light in position. A plug-in model may include a switch or may be turned on by plugging into the wall outlet.

In light of the above disclosure, other embodiments will become obvious to those of ordinary skill in the art, and are intended to fall within the scope of the invention.

I claim:

1. For a liquid crystal display unit having a back panel through which light can penetrate and a front viewing surface which can be lighted by light which penetrates through said back panel, a back light which derives power from a renewable internal power source which does not power said liquid crystal display unit and which can be attached to and removed from said liquid crystal display unit.

2. A back light as in claim 1 comprising an electroluminescent panel, an internal power source, and a means for providing power from said internal power source to said electroluminescent panel.

3. A back light as in claim 2 further comprising a filter which controls the color of light from said electroluminescent panel.

4. A back light as in claim 2 further comprising a housing which holds said internal power source, said electroluminescent panel, and said means for providing power from said internal power source to said electroluminescent panel, and further includes means for attaching said housing to said liquid crystal display unit.

5. A back light as in claim 4 further comprising a mounting board which attaches said electroluminescent panel to said housing.

6. A back light as in claim 1 in which said power is supplied to said back light by means of a plug and a wall outlet.

7. A back light as in claim 2 in which said power source causes no increase in thickness of said back light unit beyond that required for providing light.

8. A back light as in claim 2 in which said power source causes no increase in width of said back light unit beyond that required for providing light.

* * * * *